June 27, 1950  M. W. HUBER  2,512,799
HYDRAULIC CONTROL SYSTEM RESPONSIVE
TO PRESSURE AND FLOW RATE Filed June 13, 1947  2 Sheets-Sheet 2

Inventor
Matthew W. Huber

By Dodge

Attorneys

Patented June 27, 1950

2,512,799

UNITED STATES PATENT OFFICE 2,512,799

HYDRAULIC CONTROL SYSTEM RESPONSIVE TO PRESSURE AND FLOW RATE

Matthew W. Huber, Watertown, N. Y., assignor to The New York Air Brake Company, a corporation of New Jersey Application June 13, 1947, Serial No. 754,488

7 Claims. (Cl. 60—52)

This invention relates to hydraulic circuits and to a variable displacement pump intended for use in such circuits and characterized by a novel control in which the displacement of the pump is controlled primarily in response to the pressure of discharge and secondarily in response to changes in the rate of discharge flow above and below a predetermined value.

The invention was developed to meet conditions encountered in airplane service. The invention is applicable generally to hydraulic circuits, but develops peculiar utility when used to furnish hydraulic liquid for operating accessory devices on airplanes. Consequently it will be described as so applied.

The hydraulic pump used on airplanes for secondary power purposes is customarily driven by one of the propelling engines, and for that reason must run continuously while the airplane is in flight. The secondary devices which are hydraulically operated include such mechanisms as flaps, landing gear, tail surfaces and various others. Since weight is a controlling factor, the secondary motors must be small, a circumstance which requires the hydraulic pressures to be as high as is practicable. Attempts to operate hydraulic systems continuously under pressures of the order of 3000 p. s. i. or higher have resulted in frequent difficulty because of leakage or even more serious failures.

According to the present invention, I provide a pump having means for progressively varying its displacement from full capacity to zero. The pump can take several known forms but I prefer and here illustrate a swash-plate-actuated parallel-plunger pump similar to that described and claimed in my copending application, Serial No. 626,690, filed November 5, 1945, and since issued as Patent No. 2,433,222 on December 23, 1947. In such a pump the discharge pressure developed by the pump reacts on a spring loaded regulatory piston to move said piston a distance which varies with the discharge pressure developed by the pump. The regulatory piston shifts spill-back valves which, as the piston moves under rising pressure, shorten the effective stroke of the pump. According to the present invention, the spring which loads the regulatory piston is sustained by a shiftable spring seat. The limits of its shift are such that in the low setting the regulatory piston will shift to zero or approximately zero pump displacement position under a discharge pressure of about 100 p. s. i. and in the high setting said piston will start to shift at about 2800 p. s. i. and arrive in zero discharge position under a discharge pressure of say 3000 p. s. i. The spring seat is shifted by a pressure motor and this motor is put under pressures or vented alternatively, according as the discharge flow from the pump is above or below a predetermined value. In this way the regulatory mechanism is made entirely self-contained and is included in the pump structure.

Since the maintenance of high discharge pressure is dependent on maintenance of flow above a chosen rate, special precautions are necessary in any case where the stalling of an actuated motor will inhibit flow from the pump. Where this condition is encountered, it can be met by incorporating in the valve which controls the actuated motor, a port which will pass sufficient pressure liquid to keep the pump operating at high pressure whenever the valve is set to cause the motor to operate. In cases where for any reason the conditions just mentioned are not encountered, ordinary stop valves or ordinary stop and waste valves may be used.

The invention will now be described by reference to the accompanying drawing, in which.

Figure 1:
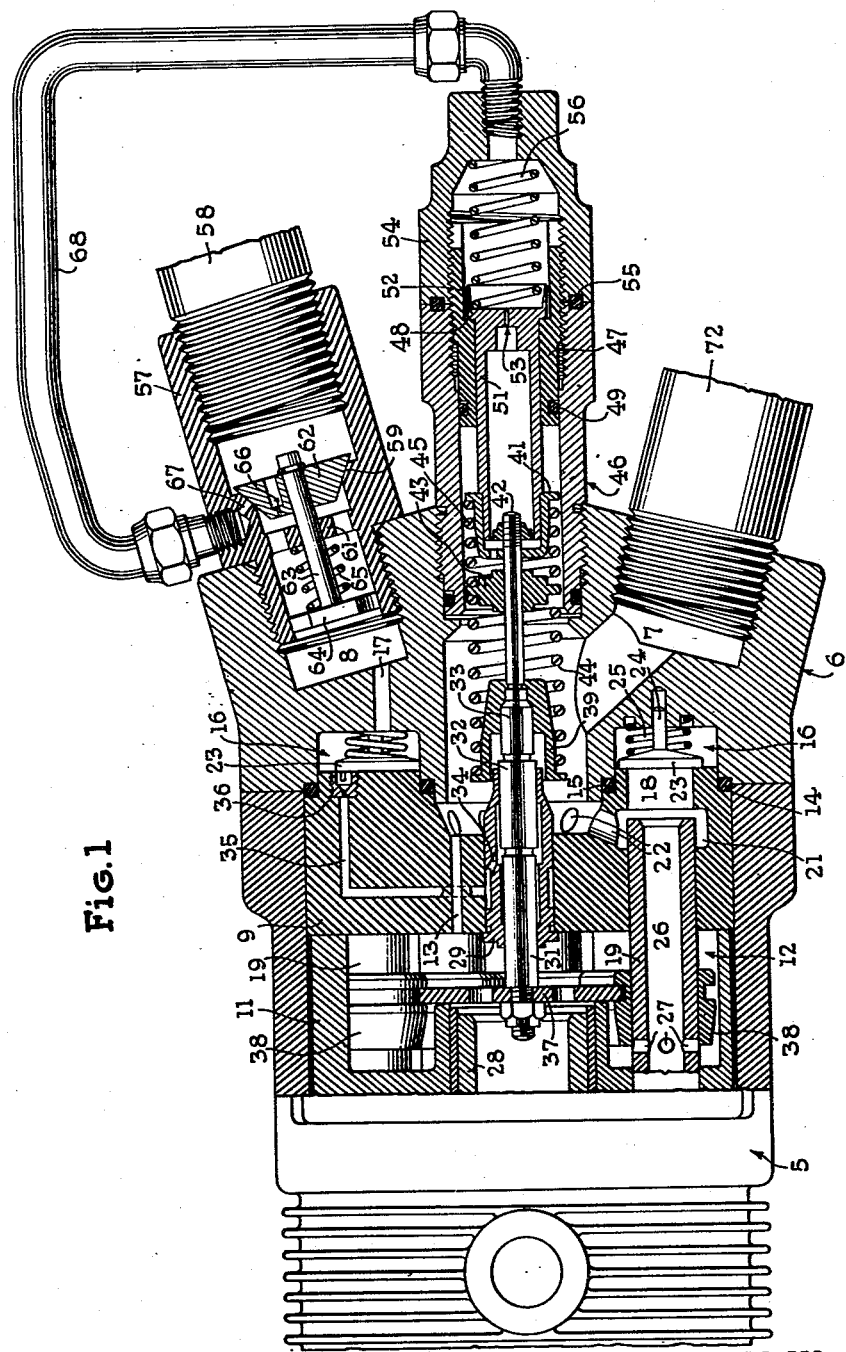
Fig. 1 is an axial section of so much of a parallel cylinder, swash-plate actuated pump as is necessary to illustrate a typical discharge control mechanism.

Refer to Fig. 1. Statements of direction used in the following description refer to the pump as positioned in Fig. 1.

The housing of the pump comprises a body 5 and a cap 6. The cap has an inlet passage 7 and a discharge passage 8, each threaded to receive connections hereinafter described.

Housed in the body 5 and clamped between the body and cap is an assembly made up of the cylinder block 9 and the guide block 11. These are annular in form and enclose between them a chamber 12 which communicates with the inlet passage 7 by a passage 13. The two blocks are rigidly connected together by a dowel and screws, not visible on the drawing.

The outer periphery of the cylinder block 9 is channeled to receive the ring gasket 14 which seals the joints between the body 5, cap 6 and cylinder block 9. Another annular channel receives the ring gasket 15 which seals the joint between the cap and cylinder block 9 at the inner margin of the latter. Thus the annular discharge passage 16, formed in cap 6 is isolated. It communicates with discharge passage 8 by way of drilled passage 17.

The two blocks 9 and 11 have alined bores of the same size, those in block 9 forming the cylinders 18 and those in block 11 serving as guides for the plungers 19. In the pump chosen for illustration there are nine plungers, but the number is a matter of design.

The cylinder bores 18 are each encircled by a groove 21 which is the inlet port, controlled by the end of the corresponding plunger. Drilled passages 22 connect the inlet ports with the pump inlet passage 7. There is a discharge valve 23 for each cylinder. These valves are mounted in passage 16 and each valve is guided by a stem 24 and seated by a coil compression spring 25. The valves seat on cylinder block 9 in areas encircling the corresponding cylinder bore.

The various plungers 19 extend, each through the guide bore in block 11, across chamber 12 and into its cylinder 18, and each is reciprocated so as to overtravel inlet port 21 and at its limit of motion to approach valve 23 closely. The plungers have counterbores 26 leading from their ends. Radial drilled ports 27 lead from the counterbore 26, and are so positioned that they are always within the limits of chamber 12 as the plungers reciprocate.

The mechanism which reciprocates the plungers is not illustrated but preferably conforms to the structure of my prior application above identified. A generally similar plunger-actuating mechanism is shown in my Patent 2,385,990, October 2, 1945. Briefly, a drive shaft 28 carries a swash-plate (not shown) and this reacts on the ends of the plungers 19 through creep plates and universally tiltable thrust heads (not shown), the latter mounted on the plungers. The plungers are reciprocated with harmonic motion in a maintained phase relation, as will readily be understood.

Pressed into the central aperture in cylinder block 9 is a bushing 29, which forms the cylinder of the regulatory motor. At its left end it is bored to fit stem 31 and at its right end it is bored to fit piston head 32 which is slightly larger. Both are lapped fits so as to be substantially leak-proof under the high discharge pressures developed by the pump. To the right of bushing 29 stem 31 terminates in a thrust head 33.

At mid-length, the bore of bushing 29 is enlarged and to this enlarged portion a port 34 leads from an encircling groove. To this groove a port 35 leads from discharge passage 16. A choke 36 is interposed in passage 35 to damp out pressure surges.

Stem 31 carries a ported spider 37 which engages in grooves encircling the sleeve-like spillback valves 38. There is one such valve encircling each plunger 19 and controlling the ports 27. The arrangement is such that when spider 37 is to the left, all the way, as shown, ports 27 will be closed by valve 38 just before the end of the plunger overtravels inlet port 21. As the spider moves the valves further and further to the right, ports 27 are closed later and later in the plunger stroke until at the right hand limit of the spider's motion the ports are not closed at all.

Since discharge pressure urges piston head 32 to the right the stem 31 is spring biased to the left. Since the discharge pressures are high and it is desired that the piston move full stroke near the upper pressure limit (say, for example, between 2800 and 3000 p. s. i. discharge pressure) it is desirable to use a piston 32 of very small effective area, so that the loading spring may be light and of low "scale." "Scale" is defined as the rate at which spring resistance rises per unit of deflection.

The spring assembly comprises a spring seat 39 seated on head 33 and connected with an opposed spring seat 41 by a guide bolt 42. Slidable on bolt 42 is an intermediate spring seat 43 between which and respective seats 39 and 41 the springs 44 and 45 are mounted. The bolt guides the intermediate seat and holds the parts together for convenience in assembly. The arrangement affords a rather long spring unit protected against lateral deflection.

So far, the pump is essentially identical with that described in my copending application above identified. The present invention requires the addition of means to vary the loading of the regulatory motor in response to changes in the rate of discharge flow from the pump.

A tubular fitting 46 is threaded in cap 6 and is coaxial with stem 31. The threaded joint has a sealing gasket clearly shown in the drawing. Adjustably threaded into fitting 46 is a cylinder bushing 47 having a stop shoulder 48. The bushing 47 is sealed in the fitting by a ring gasket 49, and its adjustment changes the position of shoulder 48.

Slidable in bushing 47 is an elongated piston 51 having an enlarged head 52 which engages shoulder 48 to limit the leftward (inward) motion of the piston. A bleed port 53 allows restricted flow of pressure liquid from the outer (right hand) side of piston 51 to inlet passage 7. Spring-seat 41 is mounted on the left hand end of piston 51. A cap 54 is threaded onto the projecting end of cylinder bushing 47 and is sealed to fitting 46 by ring gasket 55. A comparatively light spring 56 urges piston 51 inward (to the left).

When the space to the right of piston 51 is under pump discharge pressure the piston is held in the position shown in Fig. 1, in which springs 44, 45 load piston 32 and set the pump controller to maintain the high pressure here assumed to be 3000 p. s. i. Under such conditions spider 37 will start to move to the right when discharge pressure reaches, say, 2800 p. s. i.

When the space to the right of piston 51 is vented springs 44, 45 elongate to the limit set by bolt 42, and the control is transferred to spring 56 which will allow spider 37 to move all the way to the right under a pressure of say 100 p. s. i. Any desired low pressure may be used provided it is sufficient to move piston 51 to the left (preferably full stroke) against the urge of springs 44, 45.

Threaded into discharge connection 8 is a fitting 57 to which the pump discharge line 58 is connected. Formed in fitting 57 are a valve seat 59 and a spider 61 which serve as a combined guide and spring seat. A conical poppet valve 62 coacts with seat 59 and has a stem 63 which is guided in spider 61 and carries at its end a fluted head 64 between which and spider 61 a coil compression spring 65 reacts to seat the valve. A minute bleed port 66 permits flow through the valve 62.

A port 67 is formed in seat 59 and is connected by branch connection 68 with the space within cap 54 to the right of piston 51.

Thus, if flow from connection 58 is permitted at a rate beyond the capacity of port 66, valve 62 will open and discharge pressure will be admitted against the right (outer) side of piston 51. Piston 51 will be forced to the left and the pump will operate to deliver at high pressure, here assumed to be 3000 p. s. i.

If flow through line 58 is stopped, valve 62 will seat, closing port 67. Port 53 will allow the pressure to the right of piston 51 to bleed away, control will be transferred to spring 56 and the pump will commence to deliver at some low pressure, say 100 p. s. i., but will maintain that low pressure.

The fitting 57 and the valve mechanism therein are typical of any device which will respond to changes of flow rate past a chosen value, and permit or prevent flow through connection 68.

Such a pump can be used for various purposes and two examples are illustrated.

Figure 2:
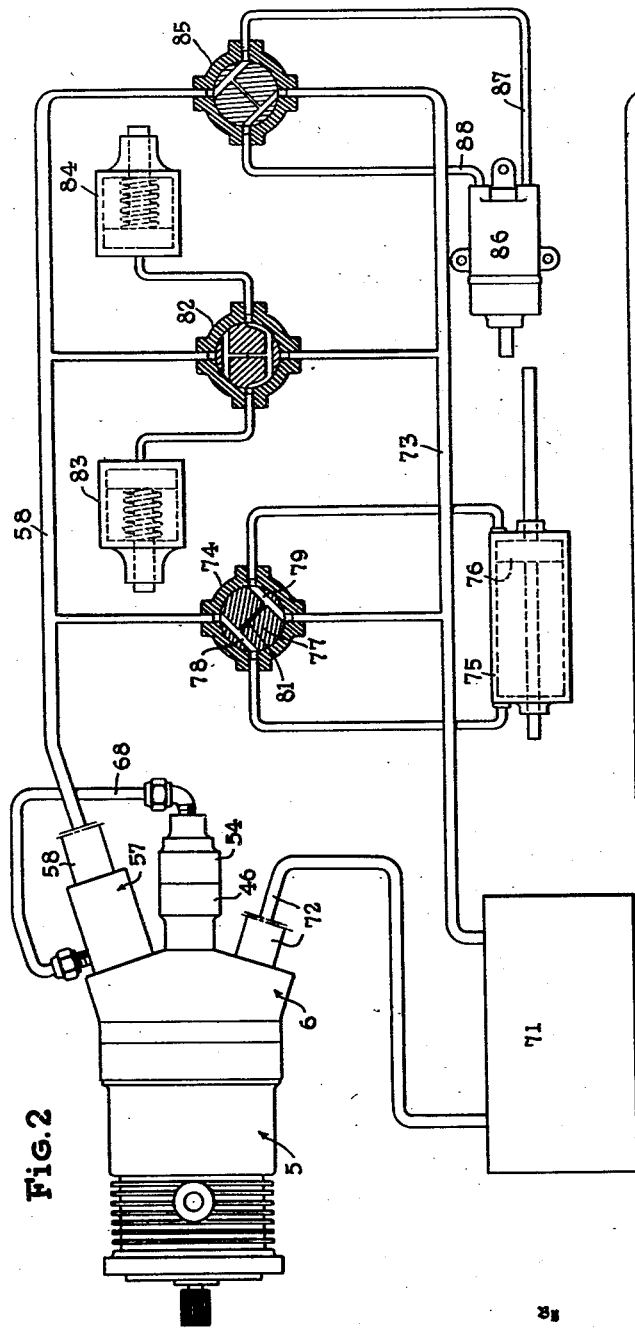
Fig. 2 is a diagram of such a pump connected in circuit with several motors and special control valves.

In Fig. 2 the pump delivers to line 58 and is fed from sump 71 by line 72 which leads to connection 7 of the pump. An exhaust line is shown at 73.

Three specially constructed 4-way valves are connected to lines 58 and 73. Valve 74 controls a double acting piston motor 75. It is shown in position to cause the motor piston 76 to moves to the right. The plug 77 of the valve has two main ports 78, 79 connected by a bleed port 81 whose flow capacity sufficiently exceeds that of bleed port 66 to assure that valve 62 will be opened if the valve plug 77 is set to operate motor 75 in either direction. The porting is such that port 81 is closed in any lap (closed) position of valve plug 77.

The valve 82 which controls two single acting motors 83 and 84 is shown in a slightly modified form which will admit fluid to either motor while exhausting the other, and also may be set to exhaust both.

Valve 85 which is identical with valve 74 controls a hydraulic engine 86, such as shown in my Patent 2,391,575 issued December 25, 1945. This engine turns in one or the other direction according as the connections 87 and 88 are interchanged, either being supply while the other is exhaust. The valve when set in its lap position stops the motor.

Figure 3:
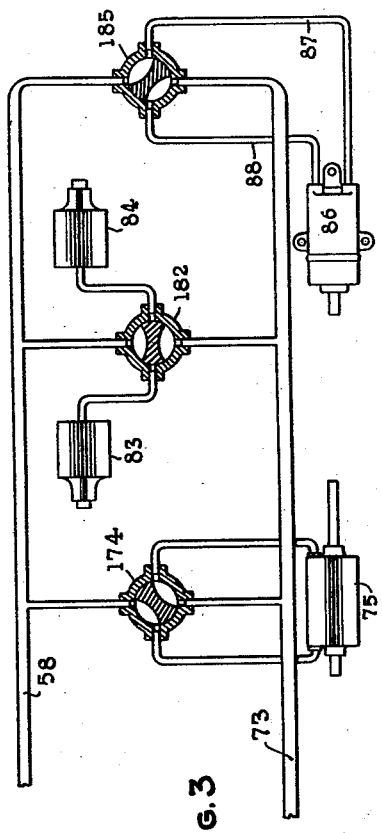
Fig. 3 is a similar diagram drawn on a reduced scale and showing the use of ordinary multi-way valves.

In Fig. 3 the substitution of ordinary 4-way valves 174, 182 and 185 for valves 74, 82 and 85 is indicated. This is practicable in the event that the controlled motor need not be kept under pressure after it has stalled. Obviously stalling of a motor or motors in such a way as to stop flow through line 58 will cause the pump control to set for low pressure, a circumstance which emphasizes the importance of port 81 (Fig. 2), in any case where sustained high pressure is desired so long as any valve is set to operate a motor.

While typical arrangements have been illustrated, there are various other relationships in which the inventive principle may be used.

What is claimed is:

1. The combination of a pump; a controller shiftable to vary the displacement of said pump between zero and full displacement; a regulatory motor of the expansible chamber type, subject to the discharge pressure developed by said pump, and connected to move said controller in response to rising discharge pressure in the direction to reduce pump displacement; loading means opposing such motion of said regulatory motor and controller; means for adjusting the resistance offered by said loading means; and a change-over device responsive to the rate of delivery of liquid by the pump and controlling said adjusting means to establish selectively a high loading when flow from the pump occurs at a rate above a predetermined value, and a low loading at other times.

2. The combination defined in claim 1, in which the adjusting means is fluid pressure operated, and the change-over device comprises flow-responsive means disposed in the discharge connection of the pump, and arranged to control the fluid pressure in the adjusting means.

3. The combination of a pump; a controller shiftable to vary the displacement of said pump between zero and full displacement; a regulatory motor of the expansible chamber type, subject to the discharge pressure developed by said pump, and connected to move said controller in response to rising discharge pressure in the direction to reduce pump displacement; loading means opposing such motion of said regulatory motor and controller; means for adjusting the resistance offered by said loading means; a change-over device responsive to the rate of delivery of liquid by the pump and controlling said adjusting means to establish selectively a high loading when flow from the pump occurs at a rate above a predetermined value, and a low loading at other times; and a valve located in the flow path beyond the change-over device and adjustable to limit flow to values above and below said predetermined value.

4. The combination of a pump; a controller shiftable to vary the displacement of said pump between zero and full displacement; a regulatory motor of the expansible chamber type, subject to the discharge pressure developed by said pump, and connected to move said controller in response to rising discharge pressure in the direction to reduce pump displacement; loading means opposing such motion of said regulatory motor and controller; means for adjusting the resistance offered by said loading means; a change-over device responsive to the rate of delivery of liquid by the pump and controlling said adjusting means to establish selectively a high loading when flow from the pump occurs at a rate above a predetermined value, and a low loading at other times; a fluid pressure motor; and a valve operable to connect said motor with the pump discharge or disconnect it therefrom selectively.

5. The combination of a pump; a controller shiftable to vary the displacement of said pump between zero and full displacement; a regulatory motor of the expansible chamber type, subject to the discharge pressure developed by said pump, and connected to move said controller in response to rising discharge pressure in the direction to reduce pump displacement; loading means opposing such motion of said regulatory motor and controller; means for adjusting the resistance offered by said loading means; a change-over device responsive to the rate of delivery of liquid by the pump and controlling said adjusting means to establish selectively a high loading when flow from the pump occurs at a rate above a predetermined value, and a low loading at other times; a fluid pressure motor; and a valve operable to connect said motor with the pump discharge, or disconnect it therefrom selectively, said valve including means to provide for flow from the pump, independently of flow to the motor, and at a rate above said predetermined value, when the valve connects the motor with the pump discharge.

6. The combination of a pump; a controller shiftable to vary the displacement of said pump between zero and full displacement; a regulatory motor of the expansible chamber type, subject to the discharge pressure developed by said pump, and connected to move said controller in response to rising discharge pressure in the direction to reduce pump displacement; loading means opposing such motion of said regulatory motor and controller, comprising a spring and an expansible chamber loading motor for varying the stress on said spring, said motor having a restricted vent; and a change-over device comprising flow-operated valve means associated with the pump discharge and arranged to supply liquid to said loading motor at a rate in excess of the flow capacity of its vent, when discharge flow from the pump occurs at a rate above a predetermined minimum.

7. The combination of a pump; a controller shiftable to vary the displacement of said pump between zero and full displacement; a regulatory motor of the expansible chamber type, subject to the discharge pressure developed by said pump, and connected to move said controller in response to rising discharge pressure in the direction to reduce pump displacement; loading means opposing such motion of said regulatory motor and controller, comprising a spring and an expansible chamber loading motor for varying the stress on said spring, said motor having a restricted vent; and a change-over device comprising a spring seated poppet valve, having a constantly open restricted by-pass, said valve being interposed in the path of discharge flow from the pump so as to open when flow exceeds the flow capacity of the by-pass, said valve including a secondary port, opened by the opening movement of the valve and arranged to admit liquid from the pump discharge to said loading motor at a rate in excess of the flow capacity of its vent.

MATTHEW W. HUBER.

REFERENCES CITED

The following references are of record in the file of this patent:

UNITED STATES PATENTS

| Number | Name | Date |
| --- | --- | --- |
| 2,240,898 | Wiedmann | May 6, 1941 |
| 2,250,539 | Landenberger | July 29, 1941 |
| 2,436,986 | Ashbaugh | Mar. 2, 1948 |
| 2,462,971 | Huber | Mar. 1, 1949 |